(12) United States Patent  
Tseng et al.

(10) Patent No.: US 7,598,797 B2
(45) Date of Patent: Oct. 6, 2009

(54) CHARGE PUMP CIRCUIT WITH BIPOLAR OUTPUT

(75) Inventors: Tang-Kuei Tseng, Jhudong Township, Hsinchu County (TW); Juing-Yi Cheng, Cishan Township, Kaohsiung County (TW); Ryan Hsin-Chin Jiang, Taipei (TW)

(73) Assignee: Amazing Microelectronic Corp., Taipei (TW)

( * ) Notice: Subject to any disclaimer, the term of this patent is extended or adjusted under 35 U.S.C. 154(b) by 17 days.

(21) Appl. No.: 12/018,659

(22) Filed: Jan. 23, 2008

(65) Prior Publication Data

US 2009/0027109 A1    Jan. 29, 2009

(30) Foreign Application Priority Data

Jul. 27, 2007    (TW) ................ 96127491 A (51) Int. Cl.
*G05F 1/10*    (2006.01)
(52) U.S. Cl. ....................................... 327/536
(58) Field of Classification Search ............... 327/535, 327/536, 537
See application file for complete search history.

(56) References Cited

U.S. PATENT DOCUMENTS

| 4,636,930 | A |  | 1/1987 | Bingham et al. |
| 4,679,134 | A |  | 7/1987 | Bingham et al. |
| 4,777,577 | A |  | 10/1988 | Bingham et al. |
| 4,797,899 | A |  | 1/1989 | Fuller et al. |
| 4,809,152 | A |  | 2/1989 | Bingham et al. |
| 4,812,961 | A | * | 3/1989 | Essaff et al. .................. 363/61 |
| 4,897,774 | A |  | 1/1990 | Bingham et al. |
| 4,999,761 | A |  | 3/1991 | Bingham et al. |
| 5,262,934 | A | * | 11/1993 | Price ............................ 363/60 |
| 5,306,954 | A |  | 4/1994 | Chan et al. |
| 7,282,985 | B2 | * | 10/2007 | Yen et al. ..................... 327/536 |

* cited by examiner

*Primary Examiner*—Jeffrey S Zweizig
(74) *Attorney, Agent, or Firm*—Ming Chow; Sinorica, LLC (57) ABSTRACT

A charge pump circuit with bipolar output comprises a first set of switch device capable of selectively connecting two terminals of a first transfer capacitor to a voltage source and a ground terminal, respectively, a second set of switch device capable of selectively connecting the two terminals of the first transfer capacitor to a grounded first storage capacitor and the voltage source, respectively, a third set of switch device capable of selectively connecting two terminals of a second transfer capacitor to the first transfer capacitor connected to the voltage source and the ground terminal, respectively, and a fourth set of switch device capable of selectively connecting the two terminals of the second transfer capacitor to a grounded second storage capacitor and the ground terminal, respectively. These four sets of switch devices totally have nine switches, and are collocated with clock signals to be selectively driven by a four-phase signal or a two-phase signal so as to produce bipolar voltages with magnitudes higher than the input voltage and also accomplish the highest conversion efficiency.

11 Claims, 6 Drawing Sheets

CHARGE PUMP CIRCUIT WITH BIPOLAR OUTPUT

BACKGROUND OF THE INVENTION

1. Field of the Invention

The present invention relates to a charge pump and, more particularly, to a charge pump circuit with bipolar output that can be applied to existent CMOS IC fabrication processes.

2. Description of Related Art

With the development of the manufacturing process, the size and operating voltage of components become smaller. However, the transmission voltages of I/O signals usually are higher than those of internal circuits or applied voltages. Therefore, it is necessary to design a DC voltage conversion circuit in an IC to provide a voltage source with a voltage higher than the applied voltage. Charge pump circuit is one of the DC voltage conversion circuit.

Because the charge pump circuits proposed here have the function of converting a unipolar voltage (+V) to a bipolar voltage output (+/−V) or a bipolar double voltage output (+/−2V), they can be widely used in ICs, e.g., RS-232 ICs. U.S. Pat. No. 5,306,954 proposed by Sipex Corporation, USA discloses a charge pump circuit with symmetric positive/negative voltage output capability, which is composed of two transfer capacitors, two storage capacitors, and nine switches. The operation of these switches adopts clock signals generated by means of oscillation triggering to drive four-phase switching. Moreover, U.S. Pat. No. 4,999,761 proposed by Maxim Integrated Products, USA discloses an integrated bipolar charge pump power supply and an RS-232 transmitter/receiver, in which a charge pump circuit is composed of two transfer capacitors, two storage capacitors, and eight switches. These switches are driven by two-phase clock signals.

Regardless of what type of charge pump circuits mentioned above, they have the drawbacks of both limited charge conversion efficiency and large ripple of output voltage. In particular, the four-phase switched charge pump circuit proposed by Sipex Corporation, USA has a larger ripple. Therefore, the manufacturers have been giving every effort to design a circuit structure of small size and high efficiency.

Accordingly, the present invention aims to propose a new charge pump circuit structure with bipolar output in order to solve the above problems in the prior art and create a high-efficiency circuit.

SUMMARY OF THE INVENTION

An object of the present invention is to provide a charge pump circuit with bipolar output, which is a high-efficiency charge pump. The proposed charge pump is composed of a plurality of switches which are driven with selectively four-phase or two-phase clock, The bipolar voltage of proposed new charge pump are higher than single power source input and also meets the requirement for several high voltages application in an IC or I/O interface.

Another object of the present invention is to provide a charge pump circuit with bipolar output, which has the advantages of both high conversion efficiency and smaller ripple of output voltage. Especially, the ripple of two-phase operation of proposed charge pump is even smaller.

Another object of the present invention is to provide a charge pump circuit with bipolar output, which can selectively adopt two-phase clock or four-phase clock with the same hardware architecture. Therefore, proposed charge pump has flexible and wider application.

To achieve the above objects, the present invention proposes a new charge pump circuit, which can produce bipolar voltage output based on a single input voltage. This circuit architecture includes four sets of switch devices: a first set of switch device, a second set of switch device, a third set of switch device and a fourth set of switch device. The first set of switch device can selectively connect a first transfer capacitor to a voltage source and to a ground terminal, respectively. The second set of switch device can selectively connect the first transfer capacitor to a grounded first storage capacitor and to the voltage source, respectively. The third set of switch device can selectively connect a second transfer capacitor to the first transfer capacitor connected to the voltage source and to the ground terminal, respectively. The fourth set of switch device can selectively connect the second transfer capacitor to a grounded second storage capacitor and to the ground terminal. These four sets of switch devices can perform four-phase or two-phase switching based on clock signals to selectively store charges in the first transfer capacitor, the first storage capacitor, the second transfer capacitor or the second storage capacitor so as to provide bipolar voltage output for integrated IC product.

The above first set of switch device comprises two switches: a first switch and a second switch. The first switch connects the voltage source to a first input terminal of the first transfer capacitor. The second switch connects a second input terminal of the first transfer capacitor to the ground terminal.

The above second set of switch device comprises two switches: a third switch and a fourth switch. The third switch connects the first input terminal of the first transfer capacitor to a first input terminal of the first storage capacitor. The fourth switch connects the second input terminal of the first transfer capacitor to the voltage source.

The above third set of switch device comprises three switches: a fifth switch, a sixth switch and a seventh switch. The fifth switch connects the first input terminal of the first transfer capacitor to a first input terminal of the second transfer capacitor. The sixth switch connects a second input terminal of the second transfer capacitor to the ground terminal. The seventh switch connects the second input terminal of the first transfer capacitor to the voltage source.

The above fourth set of switch device comprises two switches: an eighth switch and a ninth switch. The eighth switch connects the first input terminal of the second transfer capacitor to the ground terminal. The ninth switch connects the second input terminal of the second transfer capacitor to a second input terminal of the second storage capacitor.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE PREFERRED EMBODIMENTS

The present invention discloses a charge pump circuit with bipolar output, which is a high-efficiency charge pump and can apply to the present CMOS IC process. This charge pump circuit is composed of nine switches, four capacitors and a power source, and makes use of selectively four-phase or two-phase clock signals with the same architecture to produce bipolar voltage higher than the input voltage. The proposed charge pump meets the requirement that several high voltages for circuits in an IC or I/O circuits of an IC are needed under the condition of a single power source.

Figure 1:
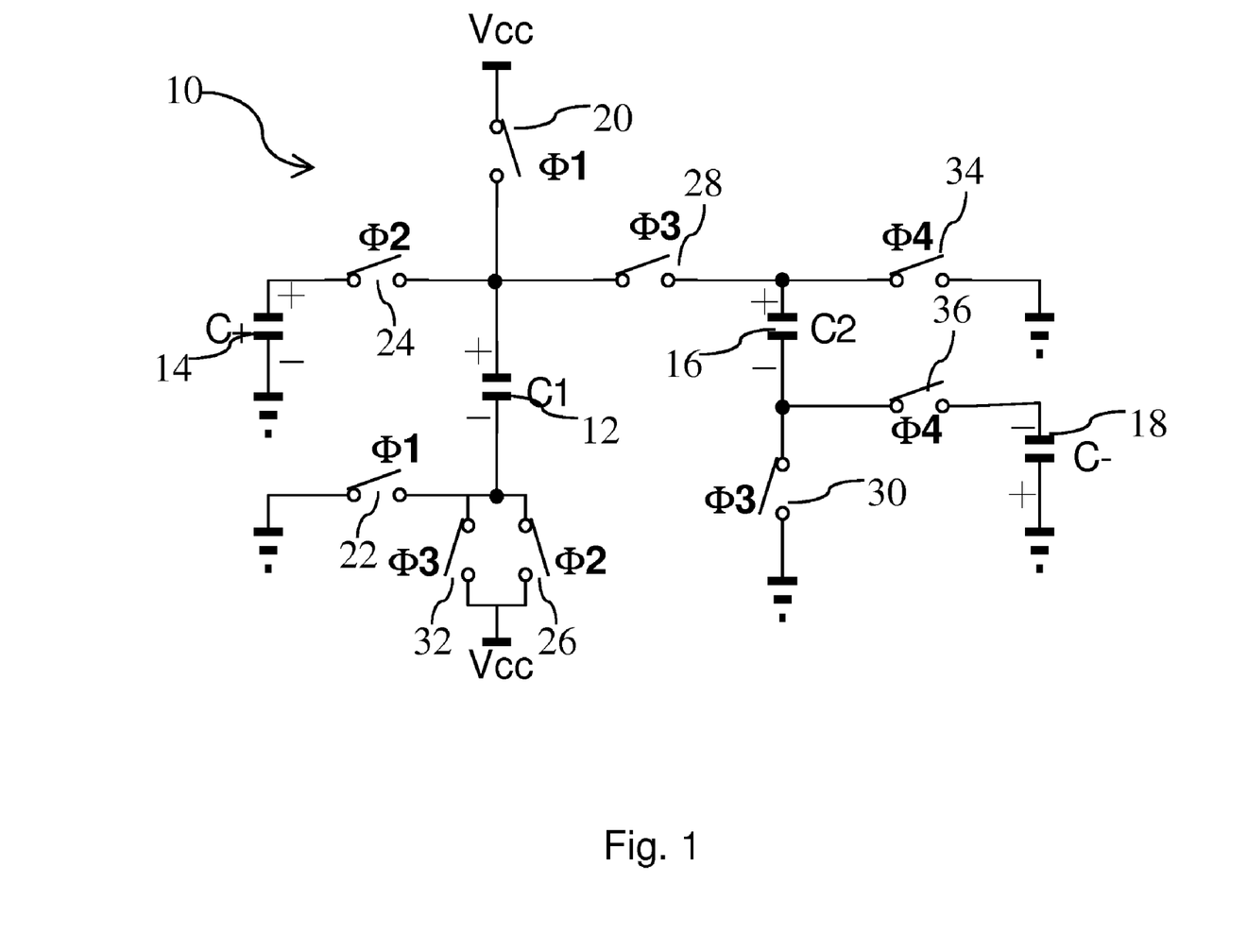
FIG. 1 is a diagram of a four-phase charge pump circuit of the present invention.

FIG. 1 is a diagram of a four-phase charge pump circuit of the present invention. As shown in FIG. 1, a charge pump circuit 10 comprises four capacitors 12, 14, 16 and 18 and four sets of switch devices (Φ1~Φ4) that totally include nine switches 20, 22, 24, 26, 28, 30, 32, 34 and 36, and provides an input voltage collocated with clock signals to control the on-time of the switches in order to adjust the level of the output voltage and thus produce bipolar voltage output. The first set of switch device Φ1 can selectively connect a first input terminal (+) and a second input terminal (−) of a first transfer capacitor (C1) 12 to a voltage source (Vcc) and to a ground terminal (Gnd), respectively. This first set of switch device Φ1 includes a first switch 20 and a second switch 22. The first switch 20 connects the voltage source (Vcc) to the first input terminal (+) of the first transfer capacitor 12. The second switch 22 connects the second input terminal (−) of the first transfer capacitor 12 to the ground terminal (Gnd). Through the conduction of the first switch 20 and the second switch 22, the voltage source (Vcc) charges on the first transfer capacitor 12. The second set of switch device Φ2 can selectively connect a first input terminal (+) of a first storage capacitor (C+) 14 to the first input terminal (+) of the first transfer capacitor 12 and the second input terminal (−) of the first transfer capacitor (C1) 12 to the voltage source (Vcc). This second set of switch device Φ2 includes a third switch 24 and a fourth switch 26. The third switch 24 connects the first input terminal (+) of the first transfer capacitor 12 to the first input terminal (+) of the first storage capacitor (C+) 14. The fourth switch 26 connects the second input terminal (−) of the first transfer capacitor (C1) 12 to the voltage source (Vcc). Through the conduction of the third switch 24 and the fourth switch 26, the voltage source (Vcc) acts on the second input terminal (−) of the first transfer capacitor 12 and responses higher voltage on the first input terminal (+) of the first storage capacitor (C+) 14.

The third set of switch device Φ3 can selectively connect a first input terminal (+) of a second transfer capacitor (C2) 16 to the first input terminal (+) of the first transfer capacitor 12, a second input terminal (−) of the second transfer capacitor (C2) 16 to the ground terminal (Gnd), and the second input terminal (−) of the first transfer capacitor (C1) 12 to the voltage source (Vcc). This third set of switch device Φ3 includes a fifth switch 28, a sixth switch 30 and a seventh switch 32. The fifth switch 28 connects the first input terminal (+) of the first transfer capacitor 12 to the first input terminal (+) of the second transfer capacitor (C2) 16. The sixth switch 30 connects the second input terminal (−) of the second transfer capacitor (C2) 16 to the ground terminal (Gnd). The seventh switch 32 connects the second input terminal (−) of the first transfer capacitor (C1) 12 to the voltage source (Vcc). Through the conduction of the fifth switch 28, the sixth switch 30 and the seventh switch 32, the voltage source (Vcc) acts on both the first transfer capacitor 12 and the second transfer capacitor 16, and responses the higher voltage on the first terminal of second transfer capacitor. The fourth set of switch device Φ4 can selectively connect a second input terminal (−) of a second storage capacitor (C−) 18 to the second input terminal (−) of the second transfer capacitor 16 and the first input terminal (+) of the second transfer capacitor 16 to the ground terminal (Gnd). This fourth set of switch device Φ4 includes an eighth switch 34 and a ninth switch 36. The eighth switch 34 connects the first input terminal (+) of the second transfer capacitor 16 to the ground terminal (Gnd). The ninth switch 36 connects the second input terminal (−) of the second transfer capacitor 16 to the second input terminal (−) of the second storage capacitor (C−) 18. Through the conduction of the eighth switch 34 and the ninth switch 36, the voltage source (Vcc) acts on the second transfer capacitor 16 and the second storage capacitor 18, and responses the absolutely higher voltage on the second terminal of the second storage capacitor.

All of the first switch 20, the second switch 22, the third switch 24, the fourth switch 26, the fifth switch 28, the sixth switch 30, the seventh switch 32, the eighth switch 34 and the ninth switch 36 can be realized with semiconductor transistors or bipolar junction transistors (BJTs), e.g., p-type MOS transistors, n-type MOS transistors, or npn or pnp transistors. Moreover, the above ground terminal can be the input of a different voltage source.

Figure 2:
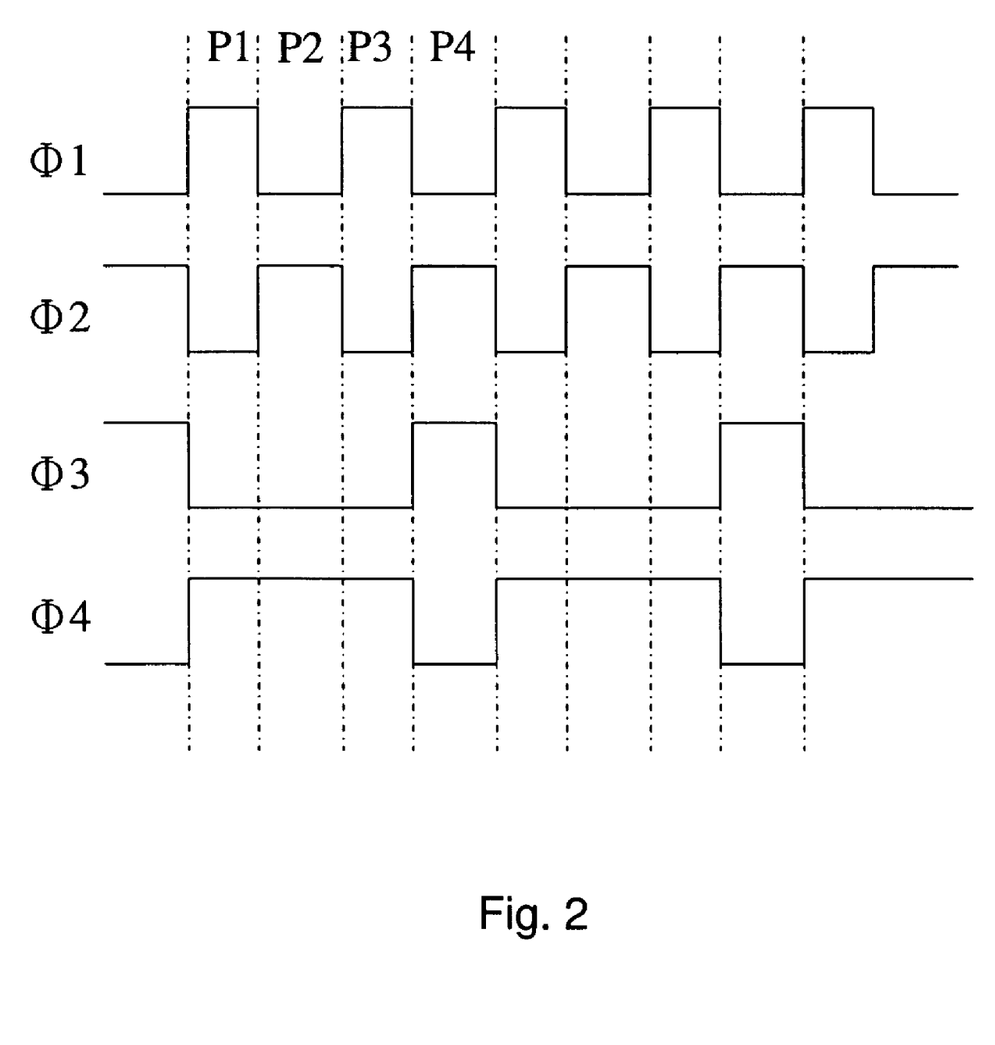
FIG. 2 is a timing diagram of four-phase control signals used in the circuit of the present invention.
Figure 3:
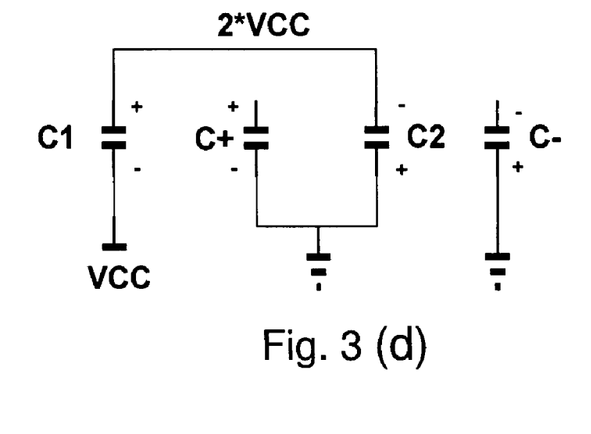
FIGS. 3(a) to 3(d) are functional diagrams under four phases operation in FIG. 1, respectively.
Figure 3A:
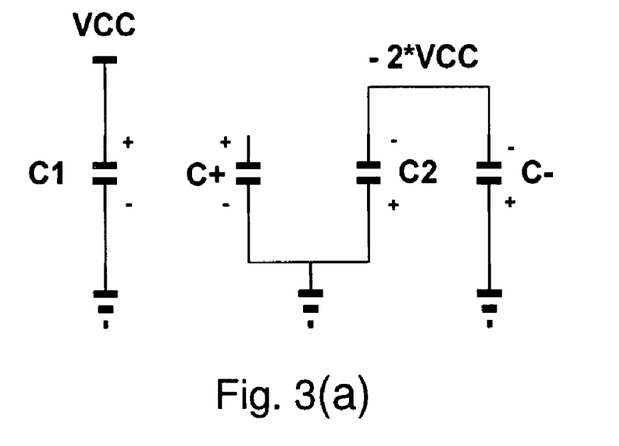
Figure 3B:
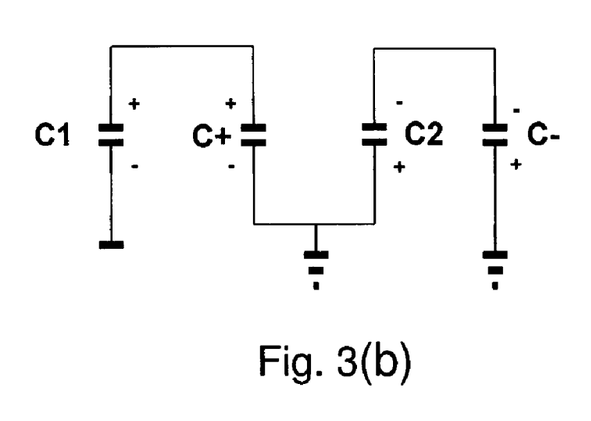
Figure 3C:
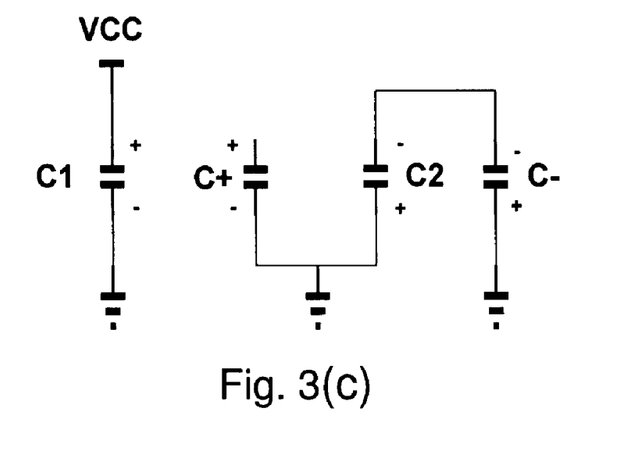

The actions of the first set of switch device Φ1, the second set of switch device Φ2, the third set of switch device Φ3 and the fourth set of switch device Φ4 are controlled by four phase clock signals generated by a clock generator (not shown). FIG. 2 is a timing diagram of four-phase control signals used in the circuit of the present invention. Please refer to FIG. 1 as well as FIG. 2. First, at the first phase (P1), the first set of switch device Φ1 and the fourth set of switch device Φ4 are enabled to let the first switch 20, the second switch 22, the eighth switch 34 and the ninth switch 36 to be on state. Under ideal conditions, assume the on-resistance of these switches is zero. When the voltage source Vcc charges the first transfer capacitor 12, the voltage on the first transfer capacitor 12 is Vcc, as shown in FIG. 3(a). Next, at the second phase (P2), the first set of switch device Φ1 is disabled while the second set of switch device Φ2 is enabled to let the third switch 24 and the fourth switch 26 to be on state. The fourth set of switch device Φ4 is selectively kept enabled or disabled. Meanwhile, the voltage source Vcc is applied on the second input terminal (−) of the first transfer capacitor 12 to produce a voltage of 2Vcc at the first input terminal (+) of the first transfer capacitor 12, and charge sharing is then happened with the first storage capacitor 14, as shown in FIG. 3(b). At the third phase (P3), the second set of switch device Φ2 is disabled while the first set of switch device Φ1 is enabled to let the first switch 20 and the second switch 22 to be on state. At this time, the fourth set of switch device Φ4 is selectively kept enabled or disabled. The voltage source Vcc charges the first transfer capacitor 12 to a voltage of Vcc, as shown in FIG. 3(c). Finally, at the fourth phase (P4), the first set of switch device Φ1 and the fourth set of switch device Φ4 are disabled, the second set of switch device Φ2 is selectively enabled, and the third set of switch device Φ3 is enabled to let the fifth switch 28, the sixth switch 30 and the seventh switch 32 to be on state. If the voltage on the first storage capacitor is insufficient at this time (P4), the third switch 24 and the fourth switch 26 can be selectively controlled to be on by clocks to let the voltage source Vcc act on the storage charges of the first transfer capacitor 12 and the second transfer capacitor 16. The first transfer capacitor 12 can also selectively act on the first storage capacitor 14 at this time (P4). Under the premise that no on-resistance of switch is taken into consideration, charges in the first transfer capacitor 12 are shared with the second transfer capacitor 16. Assuming there is no loss, there will be about a positive double voltage (2Vcc) on the first transfer capacitor 12 and the second transfer capacitor 16 after several clock periods, as shown in FIG. 3(d). After the fourth phase (P4) is finished, the first phase (P1) follows. At this time, the first switch 20 and the second switch 22 are on, and both the eighth switch 34 and the ninth switch 36 are also on to invert the positive double voltage (2Vcc) of the second transfer capacitor (C2) 16 in the fourth phase to a negative double voltage (−2Vcc). After this negative double voltage (−2Vcc) is connected to the second storage capacitor (C−) 18, a negative double voltage (−2Vcc) is produced. Therefore, control signals of four different phases are used to control the actions of four sets of switch devices in order to produce bipolar voltage of a voltage that are higher than the input voltage.

In addition to use the above clock control signals, the actions of the above four-phase charge pump circuit can also be realized under the same architecture. For example, the first phase and the fourth phase can be kept the same, but the second phase and the third phase are changed. In the second phase, the first set of switch device (Φ1) and the fourth set of switch device (Φ4) are disabled but the second set of switch device (Φ2) and the third set of switch device (Φ3) are enabled to let the voltage source (Vcc) simultaneously act on the first transfer capacitor 12 and the first storage capacitor 14 and the second transfer capacitor 16. In the third phase, the second set of switch device (Φ2) and the third set of switch device (Φ3) are disabled but the first set of switch device (Φ1) and the fourth set of switch device (Φ4) are enabled to charge the first transfer capacitor and invert the voltage of the second transfer capacitor, respectively. In another embodiment, the first phase, the second phase and the third phase are kept the same, only the fourth phase is changed. In the fourth phase, the first set of switch device (Φ1) and the fourth set of switch device (Φ4) are disabled but the second set of switch device (Φ2) and the third set of switch device (Φ3) are enabled to let the voltage source (Vcc) simultaneously act on the first transfer capacitor 12 and the first storage capacitor 14 and the second transfer capacitor 16.

Figure 4:
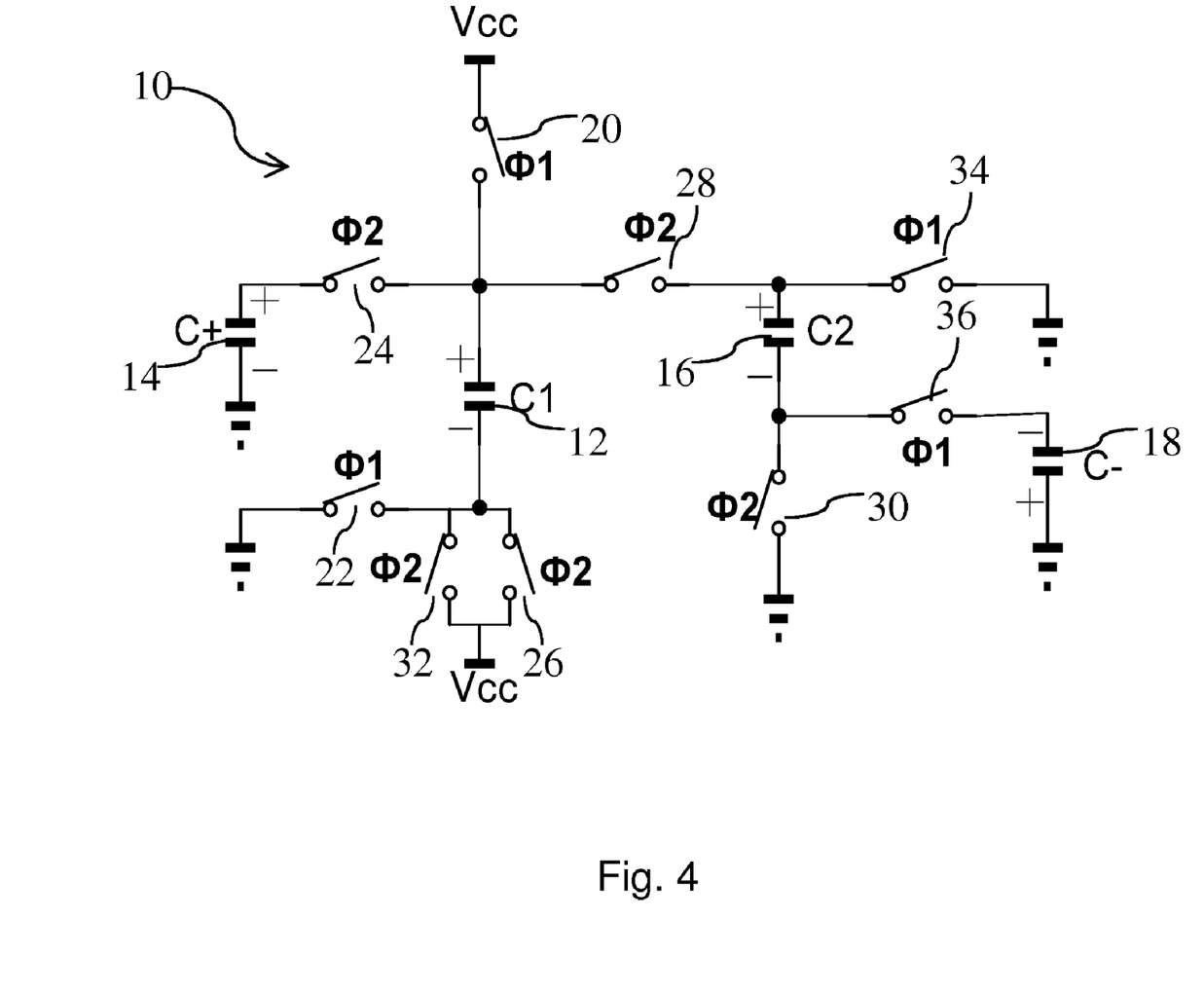
FIG. 4 is a diagram of a two-phase charge pump circuit according to another embodiment of the present invention.
Figure 5:
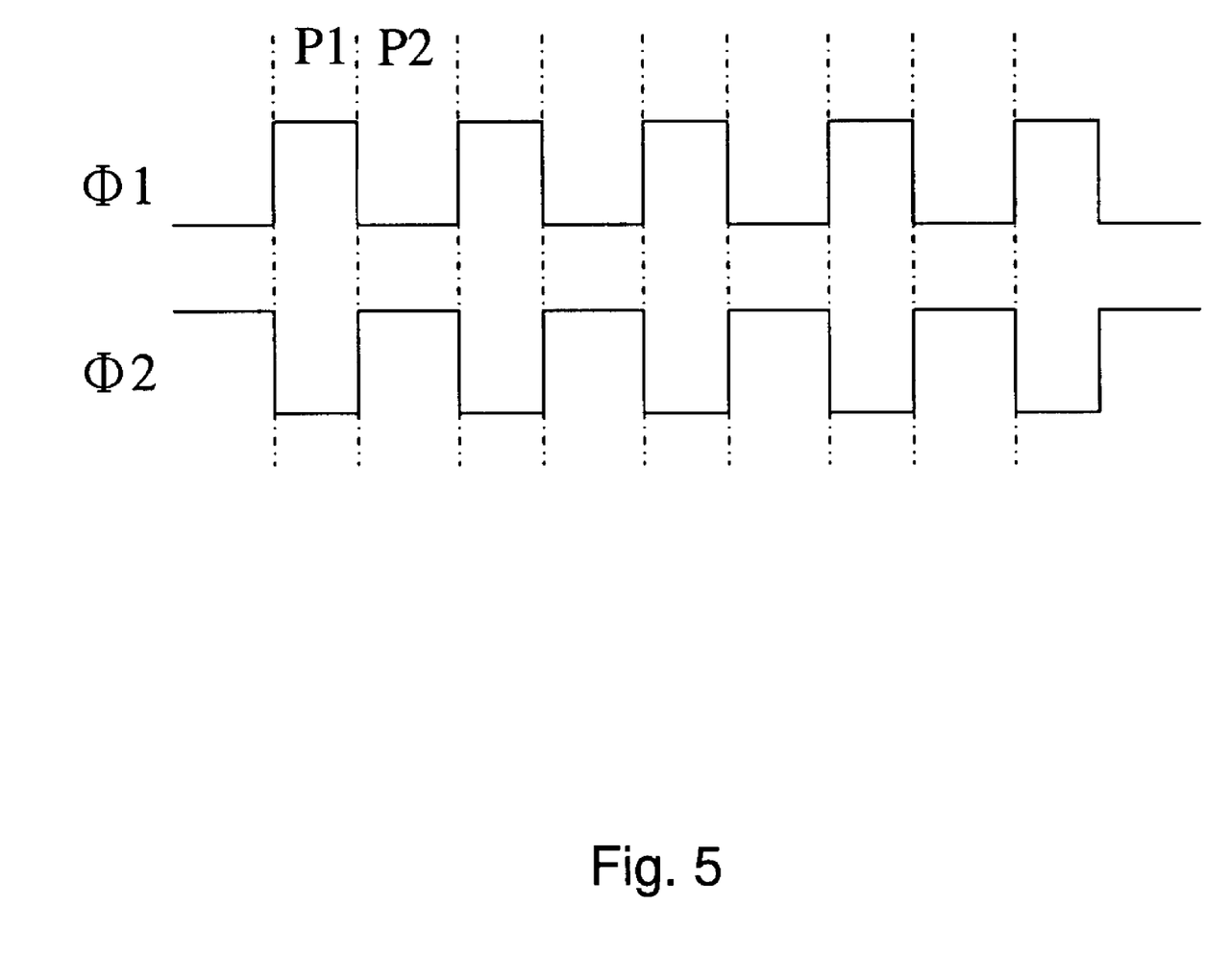
FIG. 5 is a timing diagram of two-phase control signals used in the circuit of the present invention.
Figure 6A:
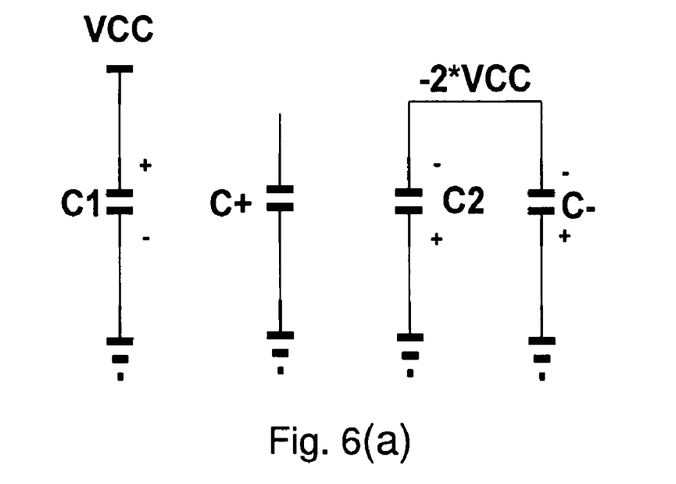
FIGS. 6(a) and 6(b) are functional diagrams under two phases operation in FIG. 4, respectively.
Figure 6B:
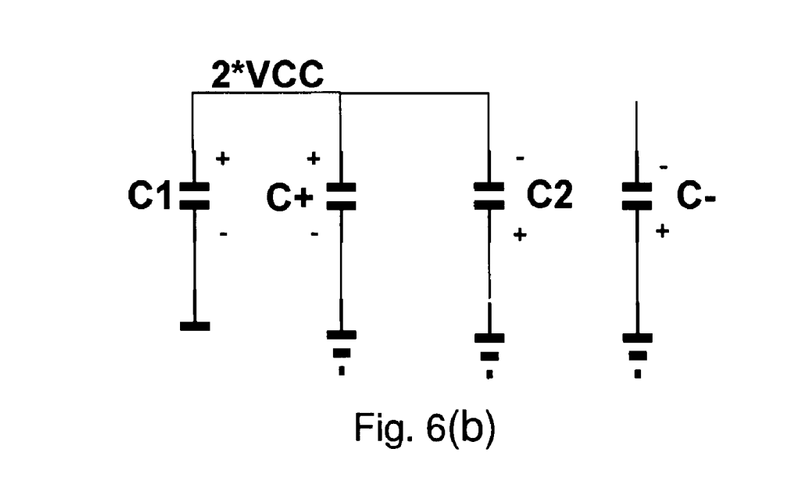

Of course, all the above embodiments are four-phase switching. The architecture shown in FIG. 1, however, can also perform two-phase switching. Speaking in detail, clock signals with the same phase are given to both the first set of switch device (Φ1) and the fourth set of switch device (Φ4), and clock signals with the same phase are given to both the second set of switch device (Φ2) and the third set of switch device (Φ3) to achieve two-phase switching. FIG. 4 is a diagram of charge pump circuit with two phase operation according to another embodiment of the present invention. As shown in FIG. 4, both the first set of switch device and the fourth set of switch device are represented by Φ1, and both the second set of switch device and the third set of switch device are represented by Φ2. FIG. 5 is a timing diagram of two-phase control signals used in this charge pump circuit. First, at the first phase (P1), the first set of switch device and the fourth set of switch device are enabled to let the first switch 20, the second switch 22, the eighth switch 34 and the ninth switch 36 be on. Under ideal conditions and assuming the on-resistance of these switches is zero, the voltage source Vcc charges the first transfer capacitor 12 to a voltage of Vcc, as shown in FIG. 6(a). Next, at the second phase (P2), the first set of switch device and the fourth set of switch device are disabled, but the second set of switch device and the third set of switch device are enabled to let the third switch 24, the fourth switch 26, the fifth switch 28, the sixth switch 30 and the seventh switch 32 be on. At this time, the voltage source Vcc acts on the first transfer capacitor 12, the first storage capacitor 14 and the second transfer capacitor 16. Under the premise that no on-resistance of switch is taken into consideration, charges in the first transfer capacitor 12 are shared with the first storage capacitor 14 and the second transfer capacitor 16. Assuming there is no loss, there will be about a positive double voltage (2Vcc) on the first transfer capacitor 12, the first storage capacitor 14 and the second transfer capacitor 16 after several clock periods, as shown in FIG. 6(b). At this time, the voltage on the first storage capacitor (C+) 14 is a positive double voltage (2Vcc). After the second phase (P2) is finished, the first phase (P1) follows. Because the second transfer capacitor (C2) 16 has a positive double voltage (2Vcc), by letting the eighth switch 34 and the ninth switch 36 be on, this positive double voltage (2Vcc) is converted to a negative double voltage (−2Vcc) that is also stored in the second storage capacitor (C−) 18. Therefore, the actions of four sets of switch devices are controlled by control signals of two different phases to produce a bipolar voltage.

In the embodiment shown in FIG. 4, because the fourth switch 26 and the seventh switch 32 are driven by the same phase, they can be integrated into a single transfer switch.

To sum up, the present invention proposes a high-efficiency charge pump with a whole new architecture. This charge pump can be four-phase driven or two-phase driven under the same architecture. Collocated with the control of the on-time of switch, output of bipolar voltages can adjust to be higher than the input voltage. Moreover, because the present invention with selectively two-phase switching or four-phase switching under the same hardware architecture has advantage of more flexible use and wider application range. Moreover, the present invention has high performance of both high charge conversion efficiency and smaller ripple of output voltage. Especially, the ripple of two-phase switching is even smaller. Therefore, the present invention has many economic benefits.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

We claim:

1. A charge pump circuit with bipolar output producing bipolar output voltages based on an input voltage, said charge pump circuit comprising:

a first set of switch devices selectively connecting a first transfer capacitor to a voltage source and to a ground terminal;

a second set of switch devices selectively connecting said first transfer capacitor to a first storage capacitor and to said voltage source;

a third set of switch devices selectively connecting said first transfer capacitor to a second transfer capacitor and to said voltage source and connecting said second transfer capacitor to said ground terminal;

a fourth set of switch devices selectively connecting said second transfer capacitor to a second storage capacitor and to said ground terminal;

a clock generator, wherein said clock generator produces a plurality of clock signals to control actions of said first set of switch devices, said second set of switch devices, said third set of switch devices and said fourth set of switch devices, respectively; and said first set of switch devices, said second set of switch devices, said third set of switch devices and fourth set of switch devices are controlled by four-phase switching.

2. The charge pump circuit with bipolar output as claimed in claim 1, wherein said first set of switch devices comprises a first switch that connects said voltage source to a first input terminal of said first transfer capacitor, and a second switch that connects a second input terminal of said first transfer capacitor to said ground terminal.

3. The charge pump circuit with bipolar output as claimed in claim 1, wherein said second set of switch devices comprises a third switch that connects a first input terminal of said first transfer capacitor to a first input terminal of said first storage capacitor, and a fourth switch that connects a second input terminal of said first transfer capacitor to said voltage source.

4. The charge pump circuit with bipolar output as claimed in claim 1, wherein said third set of switch devices comprises a fifth switch that connects a first input terminal of said first transfer capacitor to a first input terminal of said second transfer capacitor, a sixth switch that connects a second input terminal of said second transfer capacitor to said ground terminal, and a seventh switch that connects a second input terminal of said first transfer capacitor to said voltage source.

5. The charge pump circuit with bipolar output as claimed in claim 1, wherein said fourth set of switch devices comprises an eighth switch that connects a first input terminal of said second transfer capacitor to said ground terminal, and a ninth switch that connects a second input terminal of said second transfer capacitor to a second input terminal of said second storage capacitor.

6. The charge pump circuit with bipolar output as claimed in claim 1, wherein all of said first set of switch devices, said second set of switch devices, said third set of switch devices and said fourth set of switch devices are composed of semiconductor transistors or bipolar junction transistors (BJTs).

7. The charge pump circuit with bipolar output as claimed in claim 1, wherein actions of said first set of switch devices, said second set of switch devices, said third set of switch devices and said fourth set of switch devices comprises the steps of:

at a first phase, enabling said first set of switch devices and said fourth set of switch devices and disabling said second set of switch devices and said set of third switch devices to let said voltage source (Vcc) charge said first transfer capacitor, and a positive voltage in said second transfer capacitor being inverted to produce a negative voltage that is input to said second storage capacitor after enabling said fourth switch devices;

at a second phase, disabling said first set of switch devices and said third set of switch devices and enabling said second set of switch devices while selectively keeping said fourth set of switch devices enabled or disabled to let said voltage source (Vcc) act on said first transfer capacitor and said first storage capacitor;

at a third phase, disabling said second set of switch devices and said third set of switch devices and enabling said first set of switch devices while selectively keeping said fourth set of switch devices enabled or disabled to let said voltage source (Vcc) charge said first transfer capacitor; and at a fourth phase, disabling said first set of switch devices, said second set of switch devices and fourth set of switch devices and enabling said third set of switch devices to let said voltage source (Vcc) act on said first transfer capacitor and said second transfer capacitor.

8. The charge pump circuit with bipolar output as claimed in claim 1, wherein actions of said first set of switch devices, said second set of switch devices, said third set of switch devices and said fourth set of switch devices comprises the steps of:

at a first phase, enabling said first set of switch devices and said fourth set of switch devices and disabling said second set of switch devices and said third set of switch devices to let said voltage source (Vcc) charge said first transfer capacitor, meanwhile a positive voltage in said second transfer capacitor being inverted to produce a negative voltage that is input to said second storage capacitor after enabling said fourth set of switch devices;

at a second phase, disabling said first set of switch devices and said fourth set of switch devices and enabling said second set of switch devices and said third set of switch devices to let said voltage source (Vcc) simultaneously act on said first transfer capacitor and said first storage capacitor and said second transfer capacitor;

at a third phase, disabling said second set of switch devices and said third set of switch devices and enabling said first set of switch devices and said fourth set of switch devices to let said voltage source (Vcc) charge said first transfer capacitor and invert a positive voltage of said second transfer capacitor to produce a negative voltage that is also stored in said second storage capacitor; and at a fourth phase, disabling said first set of switch devices, said second set of switch devices and said fourth set of switch devices and enabling said third set of switch devices to let said voltage source (Vcc) act on said first transfer capacitor and said second transfer capacitor.

9. The charge pump circuit with bipolar output as claimed in claim 1, wherein actions of said first set of switch devices, said second set of switch devices, said third set of switch devices and said fourth set of switch devices comprises the steps of:

at a first phase, enabling said first set of switch devices and said fourth set of switch devices and disabling said second set of switch devices and said third set of switch devices to let said voltage source (Vcc) charge said first transfer capacitor, meanwhile a positive voltage in said second transfer capacitor being inverted to produce a negative voltage that is input to said second storage capacitor after enabling said fourth set of switch devices;

at a second phase, disabling said first set of switch devices and said third set of switch devices and enabling said second set of switch devices while selectively keeping said fourth set of switch devices enabled or disabled to let said voltage source (Vcc) act on said first transfer capacitor and said first storage capacitor;

at a third phase, disabling said second set of switch devices and said third set of switch devices and enabling said first set of switch devices while selectively keeping said fourth set of switch devices enabled or disabled to let said voltage source (Vcc) charge said first transfer capacitor; and at a fourth phase, disabling said first set of switch devices and said fourth set of switch devices and enabling said second set of switch devices and said third set of switch devices to let said voltage source (Vcc) simultaneously act on said first transfer capacitor, said first storage capacitor and said second transfer capacitor.

10. The charge pump circuit with bipolar output as claimed in claim 1, wherein the output voltage of said charge pump circuit is controlled between |Vcc| and 2|Vcc| and up to 2|Vcc| by controlling on-time of said first set of switch devices, said second set of switch devices, said third set of switch devices and said fourth set of switch devices.

11. The charge pump circuit with bipolar output as claimed in claim 1, wherein said ground terminal further is connected to another voltage source.

* * * * *